(12) United States Patent
Lai (10) Patent No.: US 7,289,767 B2
(45) Date of Patent: Oct. 30, 2007

(54) WIRELESS COMMUNICATION GLASSES

(76) Inventor: Chia Song Lai, P.O. Box 26-757, Taipei 106 (TW)

( * ) Notice: Subject to any disclaimer, the term of this patent is extended or adjusted under 35 U.S.C. 154(b) by 661 days.

(21) Appl. No.: 10/759,961

(22) Filed: Jan. 16, 2004

(65) Prior Publication Data

US 2005/0159182 A1  Jul. 21, 2005

(51) Int. Cl.
  *H04B 7/00* (2006.01)
  *H04B 1/06* (2006.01)
  *G02C 5/22* (2006.01)
(52) U.S. Cl. .................. 455/66.1; 455/344; 455/556.1; 455/90.3; 455/128; 351/153
(58) Field of Classification Search ............... 455/41.2, 455/66.1, 344, 90.3, 128; 351/153
See application file for complete search history.

(56) References Cited

U.S. PATENT DOCUMENTS

| | | | | |
|---|---|---|---|---|
| 4,856,086 A | * | 8/1989 | McCullough | ............... 455/344 |
| 5,020,150 A | * | 5/1991 | Shannon | ................... 455/343.1 |
| 5,606,743 A | * | 2/1997 | Vogt et al. | ................... 455/347 |
| 5,793,464 A | * | 8/1998 | Chen | ........................... 351/116 |
| 7,013,009 B2 | * | 3/2006 | Warren | ................... 379/420.01 |
| 2001/0031622 A1 | * | 10/2001 | Kivela et al. | ............... 455/11.1 |
| 2002/0098877 A1 | * | 7/2002 | Glezerman | ................... 455/568 |
| 2002/0197961 A1 | * | 12/2002 | Warren | ........................ 455/66 |
| 2004/0157649 A1 | * | 8/2004 | Jannard et al. | .......... 455/569.1 |

* cited by examiner

*Primary Examiner*—William Trost
*Assistant Examiner*—Christopher M Brandt
(74) *Attorney, Agent, or Firm*—Rosenberg, Klein & Lee (57) ABSTRACT

A wireless communication glasses has a pair of glasses, a wireless communication transceiver, a wireless transceiver module, an earphone and a microphone. The pair of glasses has a lens frame and a temple connecting with the lens frame. The wireless communication transceiver has a data cable connecting to a mobile phone. The wireless transceiver module is assembled on the temple of the glasses. The earphone is assembled on the temple of the glasses. The microphone is assembled on the temple of the glasses.

4 Claims, 8 Drawing Sheets

WIRELESS COMMUNICATION GLASSES

BACKGROUND OF THE INVENTION (1) Field of the Invention

The present invention relates to wireless communication glasses, and more particularly to wireless communication glasses that combines a pair of glasses and wireless communication devices together for wireless communication.

(2) Description of the Related Art

When a user drives a car or rides a motorcycle, it is dangerous and inconvenient to use a conventional mobile phone. Furthermore, using the conventional mobile phone involves a high-frequency electromagnetic wave that is probably bad for the health. For this reason, a conventional handsfree kit is frequently used. But the conventional handsfree kit connecting to the conventional mobile phone often suffers from loose contact. In order to improve these issues, people have gradually developed a wireless communication mode that is called bluetooth.

Figure 1:
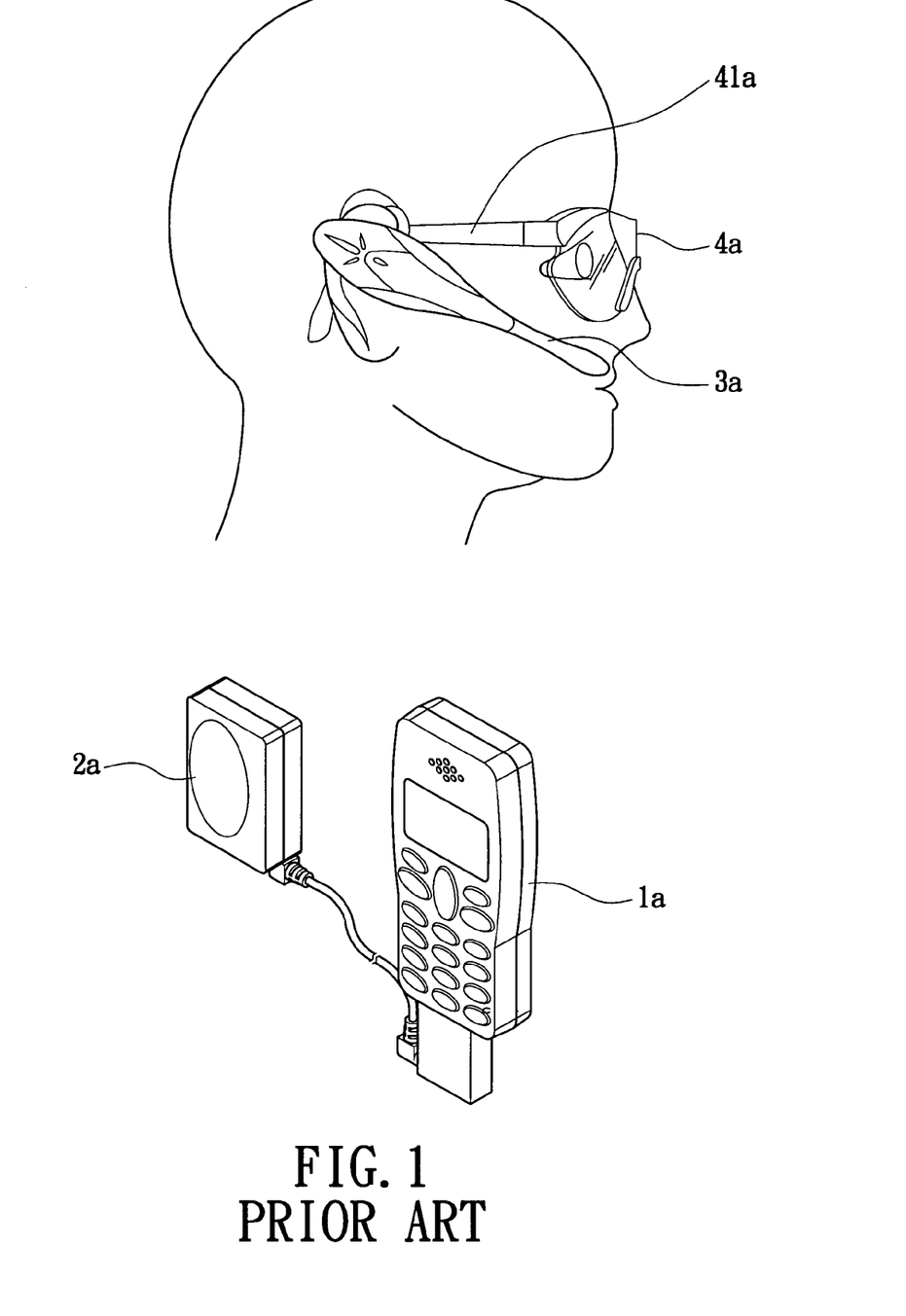
FIG. 1 is a perspective view of a conventional wireless communication device.

Referring to FIG. 1, a conventional wireless communication mode involves a conventional mobile phone 1a in wireless communication with a wireless handset 3a by a wireless communication transceiver 2a. The wireless communication transceiver 2a has a data cable 21a having a data connector 22a connecting to the conventional mobile phone 1a. The data connector 22a is made into different types of connectors in order to mate with different brands of mobile phones, so that the conventional mobile phone 1a receives signals from the wireless handset 3a or delivers signals to the wireless handset 3a by the wireless communication transceiver 2a.

However, when a user wears a pair of glasses 4a and the wireless handset 3a, the wireless handset 3a and a temple 41a of the glasses 4a respectively hook to the same ear of the user, which adds loading of the user's ear. The user also meets with inconvenience when the user first puts on the pair glasses 4a and then the wireless handset 3a.

Therefore, according to above descriptions, there are some issues of inconvenience, which need to be improved upon.

SUMMARY OF THE INVENTION

The object of the present invention provides a wireless communication glasses that combines a pair of glasses and wireless communication devices together for wireless communication.

The wireless communication glasses include a pair of glasses, a wireless communication transceiver, a wireless transceiver module, an earphone and a microphone.

The pair of glasses has a lens frame and a temple connecting with the lens frame. The wireless communication transceiver has a data cable connecting to a mobile phone. The wireless transceiver module is assembled on the temple of the glasses. The earphone is assembled on the temple of the glasses. The microphone is assembled on the temple of the glasses.

One feature of the present invention is that the temple has a flexible hooking portion formed at an end thereof. The hooking portion is curved in shape for hooking on the ear of the user.

Another feature of the present invention is that the temple further has an adjustable handle pivoted on a side thereof. The microphone is assembled on an end of the adjustable handle of the temple so that the microphone approaches a user's mouth by moving the adjustable handle.

It is to be understood that both the foregoing general description and the following detailed description are exemplary, and are intended to provide further explanation of the invention as claimed.

Other advantages and features of the invention will be apparent from the following description, drawings and claims.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF PREFERRED EMBODIMENTS

Figure 2:
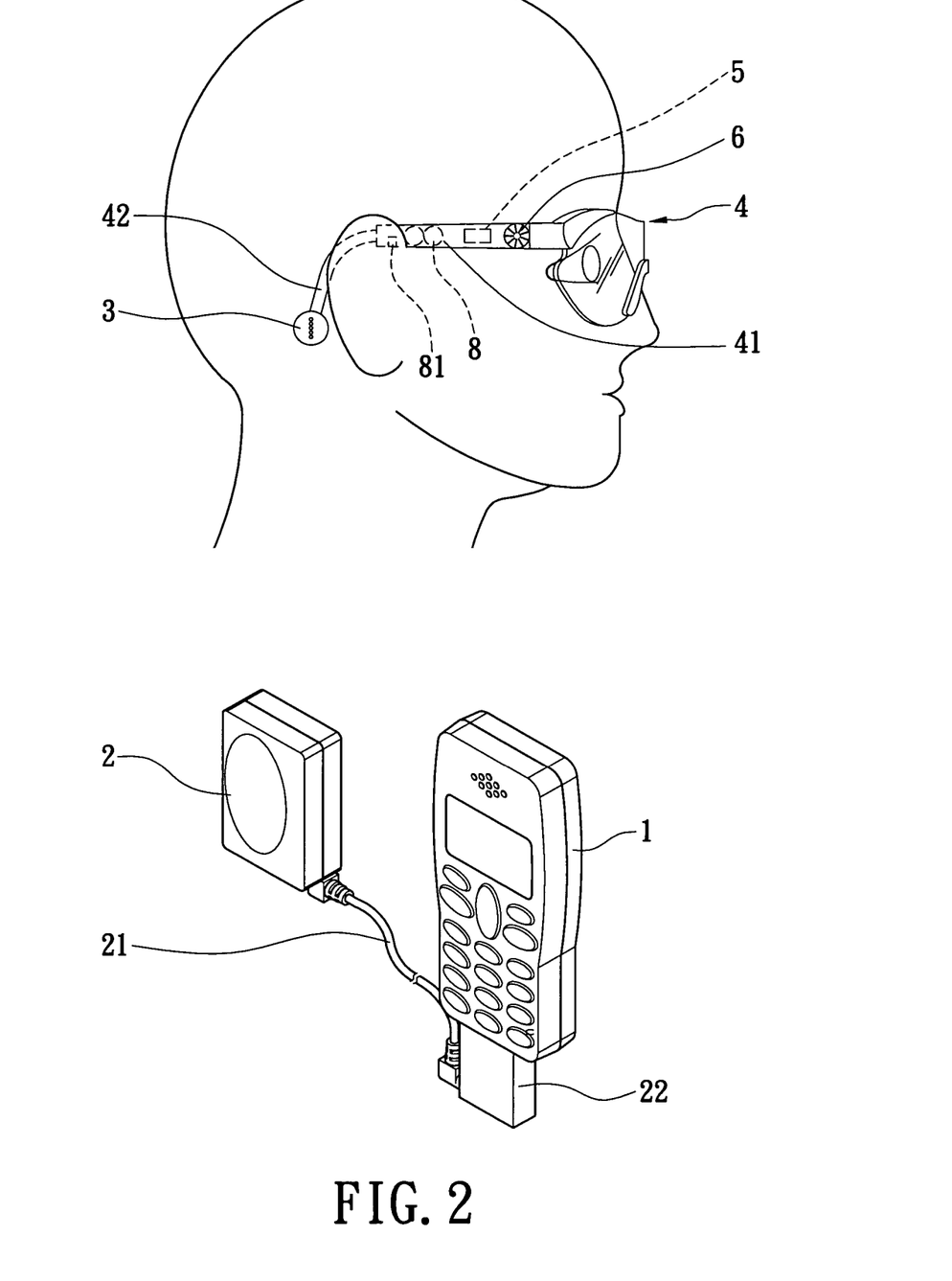
FIG. 2 is a perspective view of a first preferred embodiment of a pair of wireless communication glasses in accordance with the present invention.

Referring to FIG. 2, the present invention provides a pair wireless communication glasses. The wireless communication glasses include a pair of glasses 4, a wireless communication transceiver 2, a wireless transceiver module 5, an earphone 3 and a microphone 6.

The pair of glasses 4 has a lens frame 43 and a temple 41 connecting with the lens frame 43. The wireless communication transceiver 2 has a data cable 21 having a connector 22 connecting to a mobile phone 1. The wireless communication transceiver 2 receives signals from the mobile phone 1 and transmits signals to the mobile phone 1. The data connector 22 is made into different types of connectors in order to mate with different brands of mobile phones.

Figure 3:
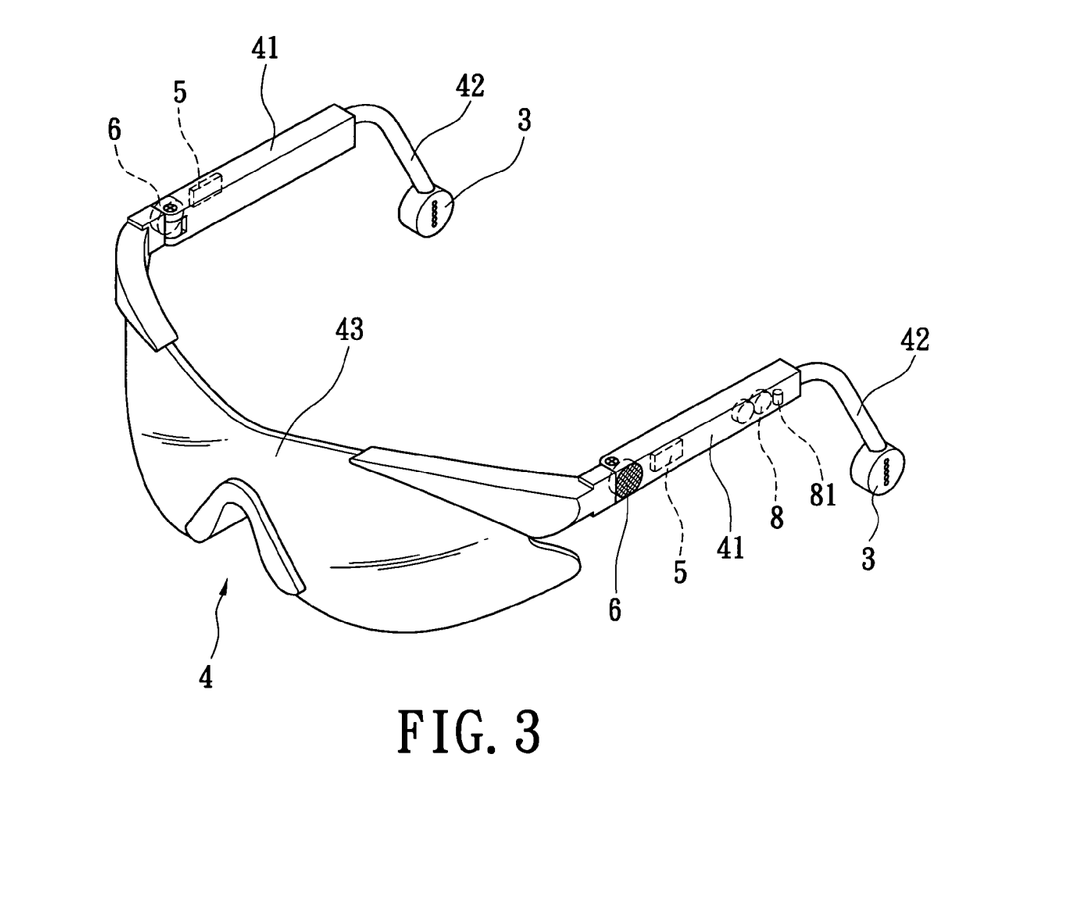
FIG. 3 is a perspective view of the glasses combined with a wireless communication device of the first preferred embodiment.

Referring to FIG. 3, the wireless transceiver module 5 is assembled on the temple 41 of the glasses 4. The wireless transceiver module 5 receives signals from the wireless communication transceiver 2 and transmits signals to the wireless communication transceiver 2. The earphone 3 receives signals from the wireless transceiver module 5 and is assembled on the temple 41 of the glasses 4 so as to make the earphone 3 near an ear of a user. The microphone 6 transmits signals to the wireless transceiver module 5 and is assembled on the temple 41 of the glasses 4. The temple 41 has a flexible hooking portion 42 formed at an end thereof, and the hooking portion 42 is curved in shape for hooking on the ear of the user. Moreover, the earphone 3 is assembled on an end of the hooking portion 42.

The temple 41 further has a battery 8 arranged therein and a charging hole 81 formed on a side thereof. The battery 8 provides power to the earphone 3, the microphone 6 and the wireless transceiver module 5. The charging hole 81 receives a plug of a battery charger that provides power to the battery 8.

Figure 4:
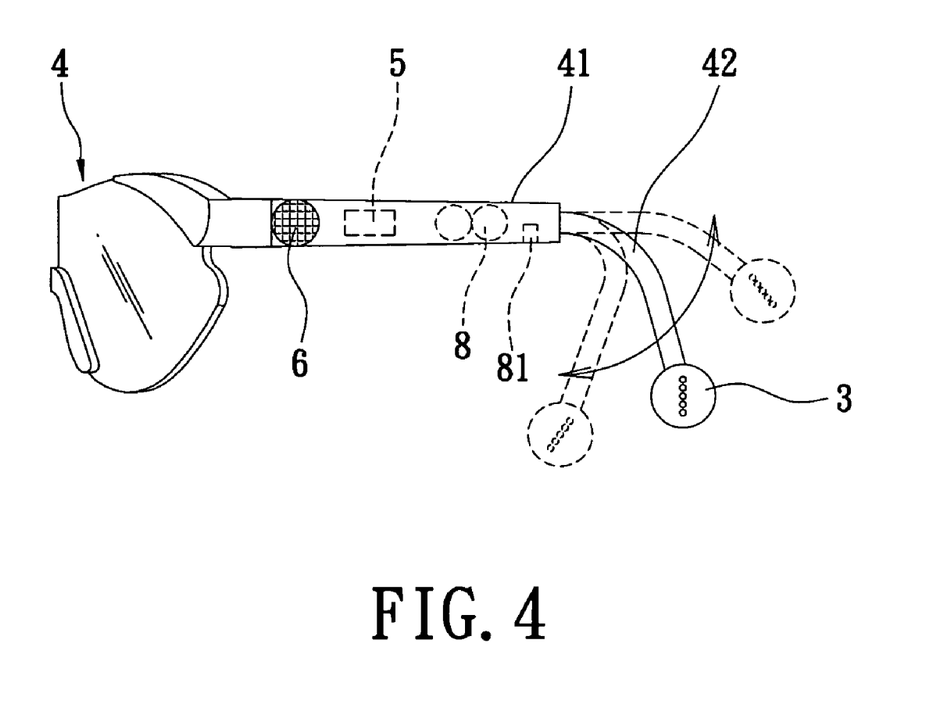
FIG. 4 shows the wireless communication glasses of the first preferred embodiment in use.

Referring to FIG. 4, the hooking portion 42 of the temple 41 is flexible so that the earphone 3 can be kept in an original position or adjusted to another position near an ear of a user when using the mobile phone 1.

Figure 5:
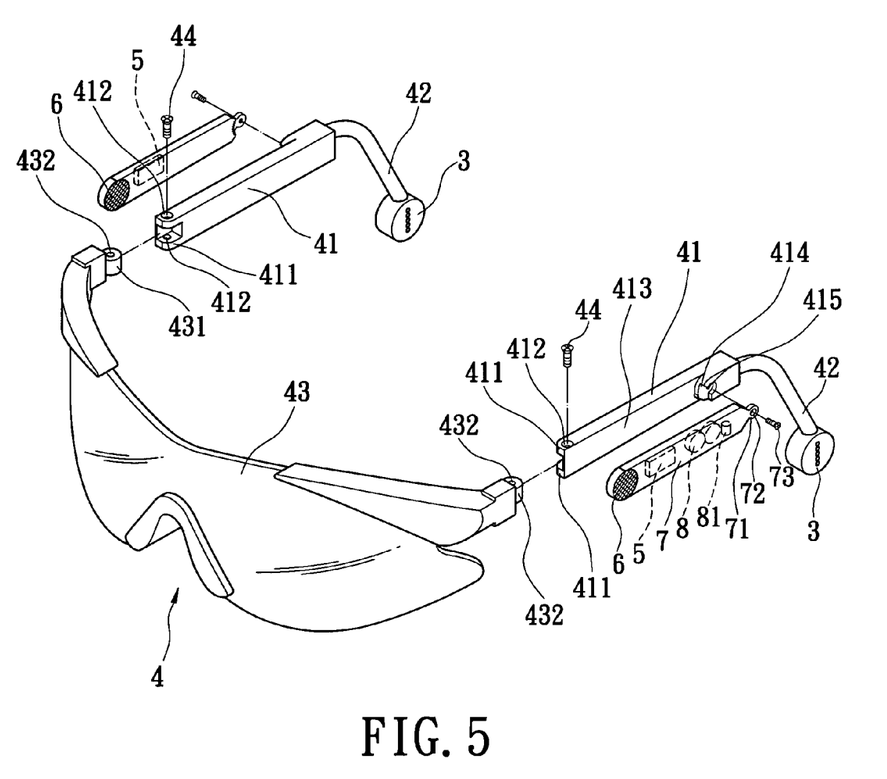
FIG. 5 is an exploded perspective view of a second preferred embodiment in accordance with the present invention.
Figure 6:
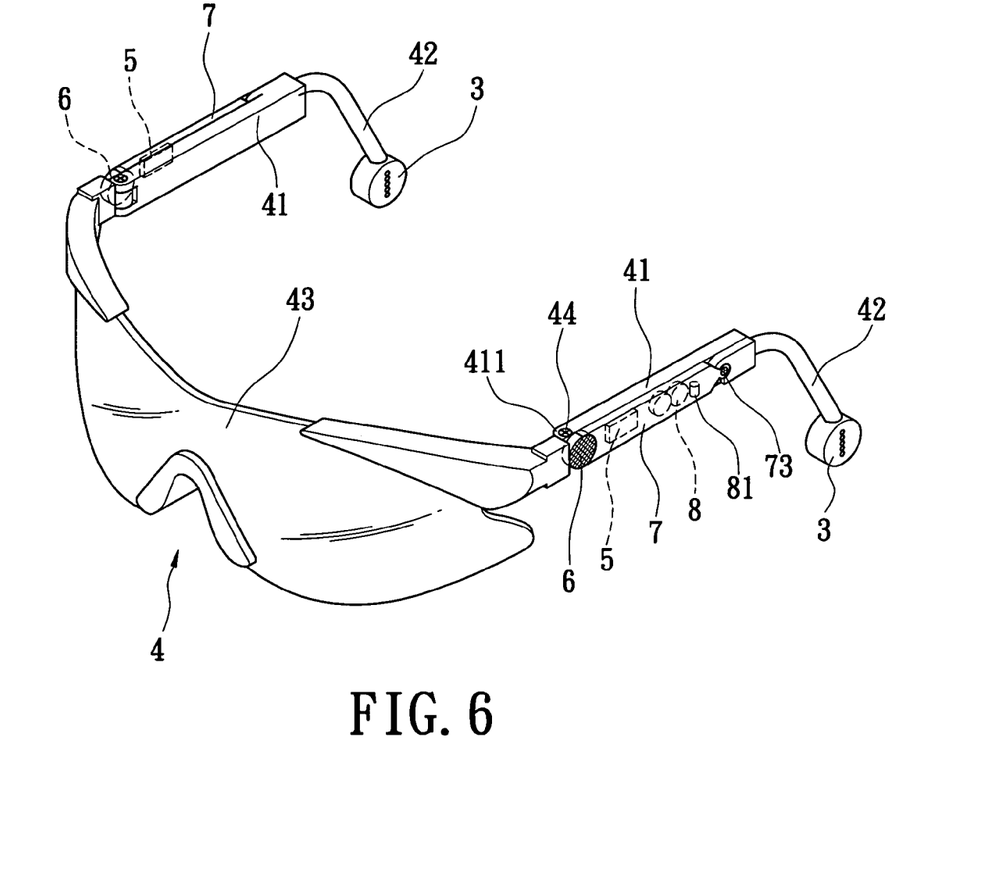
FIG. 6 is a perspective view of the second preferred embodiment.

FIG. 5 and FIG. 6 show a second preferred embodiment in accordance with the present invention. The lens frame 43 and the temple 41 are separable. The lens frame 43 has a protruding portion 431 formed on an end thereof and a screw hole 432 defined through the protruding portion 431. The temple 41 has two retaining portions 411 respectively and oppositely formed at another end thereof and two penetrating holes 412 in correspondence with the screw hole 432 of the lens frame 43 respectively formed through the two retaining portion 411. The protruding portion 431 of the lens frame 43 is arranged between the two retaining portions 411 of the temple 41 and pivotally secured by a screw 44 screwing through the screw hole 432 of the lens frame 43 and the two penetrating holes 412 of the temple 41.

The temple 41 further has an adjustable handle 7 pivoted on a side thereof to allow downward movement thereof The microphone 6 is arranged on an end of the adjustable handle 7 of the temple 41 so that the microphone 6 approaches a user's mouth by moving the adjustable handle 7. The temple 41 further has a receiving space 413 formed at the side thereof for receiving the adjustable handle 7, a holding slot 414 formed at the end thereof and a screw hole 415 formed in the holding slot 414.

The adjustable handle 7 further has a fixed portion 71 formed at an end thereof and received in the holding slot 414 of the temple 41 and a hole 72 in correspondence with the screw hole 415 of the temple 41 formed through the fixed portion 71 so that the adjustable handle 7 is secured to the temple 41 by a screw 73 screwing through the hole 72 and the screw hole 415 of the temple 41.

Figure 7:
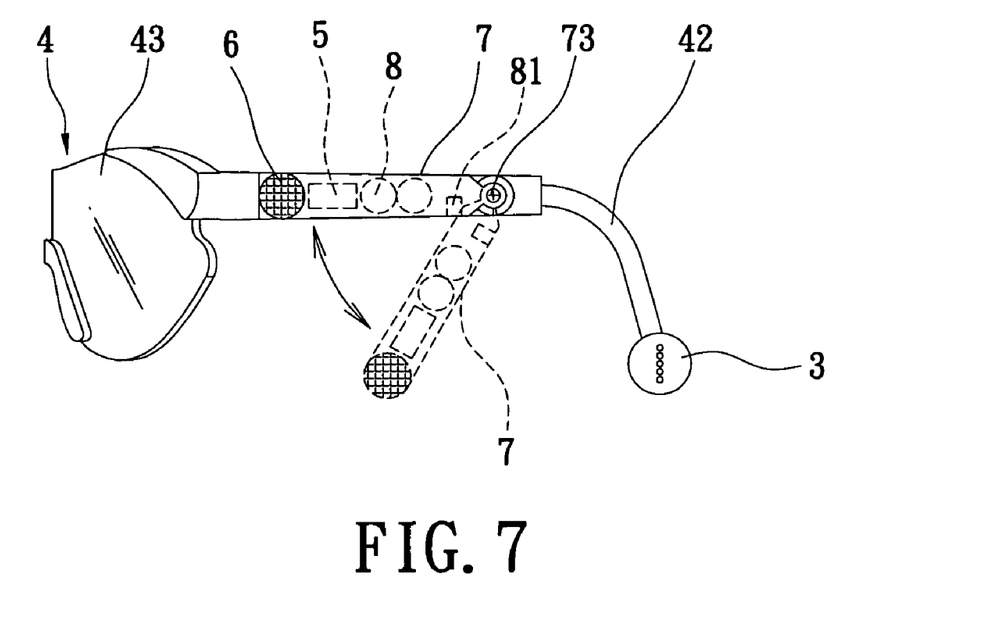
FIG. 7 show the second preferred embodiment in use.

Referring to FIG. 7, when using the mobile phone 1, the microphone 6 approaches user's mouth by downwardly moving the adjustable handle 7, for clear communication.

Figure 8:
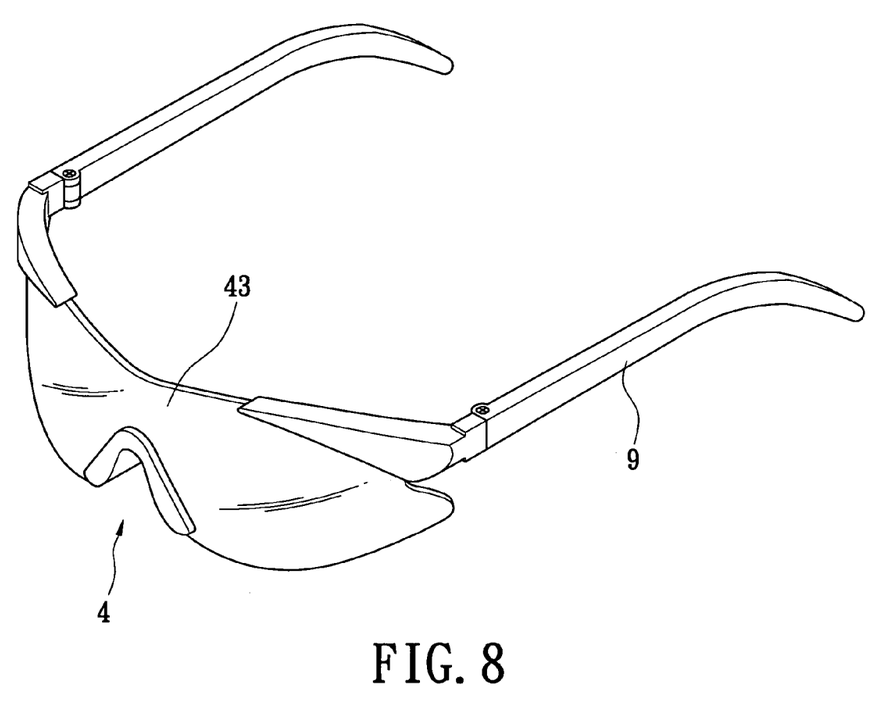
FIG. 8 is a perspective view of a third preferred embodiment in accordance with the present invention.

Referring to FIG. 8, when a user is not using the wireless communication function, the temple 41 can be replaced with a common temple 9. The user doesn't need to purchase two pairs of glasses, which it is very convenient.

The earphone 3 is directly assembled on the temple 41 of the glasses 4. When a user uses wireless communication function, the user just wears the glasses 4 and a conventional wireless handset 3a is unnecessary.

Therefore, the foregoing is considered as illustrative only of the principles of the invention. Further, since in the art, it is not desired to limit the invention to the exact construction and operation show and described, and accordingly, all suitable modifications and equivalents may be resorted to, falling within the scope of the invention.

What is claimed is:

1. A wireless communication glasses comprising:
    a pair of glasses having a lens frame and a temple connected to the lens frame, the temple having a receiving space formed on a side thereof, a holding slot formed at an end of the receiving space, and a screw hole formed in the holding slot;
    a wireless communication transceiver having a data cable connecting to a mobile phone for receiving signals from the mobile phone or transmitting signals to the mobile phone;
    an adjustable handle disposed within the receiving space and being pivotally coupled to a side of the temple, the adjustable handle having a fixed portion formed at an end thereof and received in the holding slot of the temple, the fixed portion having a hole in correspondence with the screw hole of the temple so that the adjustabe handle is secured to the temple by inserting a screw through the hole of the fixed portion and the screw hole of the temple;
    a wireless transceiver module disposed in the adjustable handle for receiving signals from the wireless communication transceiver and transmitting signals to the wireless communication transceiver;
    an earphone receiving the signals from the wireless transceiver module and assembled on the temple of the glasses so as to bring the earphone into proximity with an ear of a user;
    a microphone transmitting the signals to the wireless transceiver module and assembled on the adjustable handle; and
    a battery disposed in the adjustable handle, the adjustable handle having a charging hole for electrically connecting with the battery.

2. The wireless communication glasses as claimed in claim 1, wherein the temple has a flexible hooking portion formed at an end thereof, the hooking portion is curved in shape for hooking on the ear of the user, and the earphone is assembled on an end of the hooking portion.

3. The wireless communication glasses as claimed in claim 1, wherein the lens frame and the temple are separable from each other, the lens frame has a protruding portion formed at an end thereof and a screw hole defined through the protruding portion, the temple has two retaining portions respectively and oppositely formed at another end thereof and two penetrating holes corresponding with the screw hole of the lens frame respectively formed through the two retaining portion, and the protruding portion of the lens frame is arranged between the two retaining portions of the temple and pivotally secured by a screw screwing through the screw hole of the lens frame and the two penetrating holes of the temple.

4. The wireless communication glasses as claimed in claim 1, wherein the microphone is assembled on an end of the adjustable handle of the temple so that the microphone approaches proximity to a user's mouth by pivotal displacement of the adjustable handle.

* * * * *